Patented Dec. 19, 1922.

1,439,623

UNITED STATES PATENT OFFICE.

LOUIS L. FARKAS, OF ASTORIA, NEW YORK.

ANTISMEARING COMPOSITION FOR PRINTING INKS.

No Drawing.   Application filed April 17, 1922.   Serial No. 553,987.

*To all whom it may concern:*

Be it known that I, LOUIS L. FARKAS, a citizen of the United States, residing at Astoria, in the county of Queens, Long Island City, and State of New York, have invented certain new and useful Improvements in an Antismearing Composition for Printing Inks; and I do declare the following to be a full, clear, and exact description of the invention, such as will enable others skilled in the art to which it appertains to make and use the same.

This invention relates generally to ink and inking materials, but particularly to a composition adapted to be used in connection with printing inks to soften the latter and prevent them from being easily smeared.

The composition consists of a mixture of precipitated chalk, zinc oxide, barium sulphate and rapeseed oil.

The above named ingredients can be mixed together in various proportions to obtain the desired result, but it is preferable to mix the ingredients together in the proportions of 7 qts. of precipitated chalk, to 3½ qts. of zinc oxide, to 1¾ qts. of barium sulphate, to 8 qts. of rapeseed oil.

In preparing the composition the powder constituents, namely, the precipitated chalk, the zinc oxide and the barium sulphate, should be slowly added to the rapeseed oil and mixed with the latter until they are to a certain extent absorbed by the oil. The mixture should then be placed in a power mixer for about a half an hour and thoroughly mixed until it is worked into a smooth batter.

To use the composition it should be mixed with ink. This can be done either in a container, or on a slab, or even in the fountain of a printing press. The printing ink and the composition may be mixed together in various proportions, but it is preferable to mix about two or three avoirdupois ounces of the composition for every one pound of ink.

It has been found that when a printing ink has been mixed with the above specified composition it will not easily smear and is not of a sticky nature. The composition therefore prevents offsetting, smudging and smearing of printed surfaces, and it eliminates slip-sheeting and prevents picking and tacking, sets the colors of the ink, softens the ink and thus makes it run properly, and reduces the quantity of ink consumed.

The foregoing description will enable those skilled in the art to which the invention appertains to understand and make the use of the invention. Therefore, further description is deemed to be unnecessary.

The novelty in the invention resides in the combinations specified in the appended claims, but attention is directed to the fact that the claims permit in some instances, changes in proportions of the ingredients and also the substitution of known equivalents for the ingredients named.

What is claimed is:

1. An anti-smearing composition for printing inks consisting of chalk, zinc oxide, barium sulphate and rapeseed oil.

2. An anti-smearing composition for printing inks consisting of precipitated chalk, zinc oxide, barium sulphate and rapeseed oil, mixed together in the proportions of 7 qts. of precipitated chalk, to 3½ qts. of zinc oxide, to 1¾ qts. of barium sulphate, to 8 qts. of rapeseed oil.

In testimony whereof I have hereunto set my hand.

LOUIS L. FARKAS.